United States Patent
Mubareka

[19]

[11] Patent Number: 5,813,122
[45] Date of Patent: Sep. 29, 1998

[54] VEGETATION CONTROL MATERIAL APPLICATOR

[76] Inventor: Aboud Mubareka, 1125 Power Road, St. Joseph, Madawaska County, New Brunswick, Canada, E7B 2M3

[21] Appl. No.: 853,203

[22] Filed: May 9, 1997

[51] Int. Cl.⁶ .............................. A01C 15/06; A01D 34/82
[52] U.S. Cl. ............................ 30/276; 30/123.3; 56/16.8; 47/1.5
[58] Field of Search .................................. 30/123.3, 276; 56/16.8, DIG. 5; 47/1.5; 401/205, 206

[56] References Cited

U.S. PATENT DOCUMENTS

| | | |
|---|---|---|
| 2,908,444 | 10/1959 | Mullin ....................................... 56/16.8 |
| 2,951,314 | 9/1960 | Laughlin ................................. 30/123.3 |
| 4,027,986 | 6/1977 | Patrick . |
| 4,357,779 | 11/1982 | Maddock . |
| 4,372,047 | 2/1983 | Marttinen . |
| 4,553,350 | 11/1985 | Hardy et al. . |
| 4,719,719 | 1/1988 | Stevens ....................................... 47/1.5 |
| 4,926,662 | 5/1990 | McKee . |
| 5,050,303 | 9/1991 | Sinclair et al. ............................ 47/1.5 |
| 5,237,803 | 8/1993 | Domingue, Jr. . |

FOREIGN PATENT DOCUMENTS

| | | |
|---|---|---|
| 1297071 | 3/1992 | Canada . |
| 2183316 | 8/1995 | Canada . |

*Primary Examiner*—Hwei-siu Payer
*Attorney, Agent, or Firm*—Mario D. Theriault

[57] ABSTRACT

The vegetation control material applicator comprises a toroidal reservoir for containing a nominal amount of vegetation control material in fluid form and a circular valve assembly mounted between the reservoir and the circular saw blade of a brush saw. The reservoir and the valve assembly are mountable on the arbour of the brush saw with the valve assembly being in contact with the underside surface of the saw blade. The reservoir and valve assembly each have a diameter which is substantially less than the diameter of the saw blade. The reservoir has an opened side which is in communication with the valve assembly. The valve assembly comprises a valve disc and a valve seat. The valve disc is made of a material having the ability to resonate and to sustain a vibration therein. The valve seat is made of a material having vibration dampening properties. Therefore when an impulse is imparted by the saw blade to the valve assembly, a distortion of the valve disc relative to the valve seat causes the valve assembly to release a slight amount of vegetation control material on the underside surface of the saw blade. In another aspect of the present invention, the valve assembly comprises a set of spacers between the valve disc and the valve seat. The spacers are made of absorbent material and have a total thickness related to the viscosity index of the vegetation control material within the reservoir of the applicator.

20 Claims, 2 Drawing Sheets

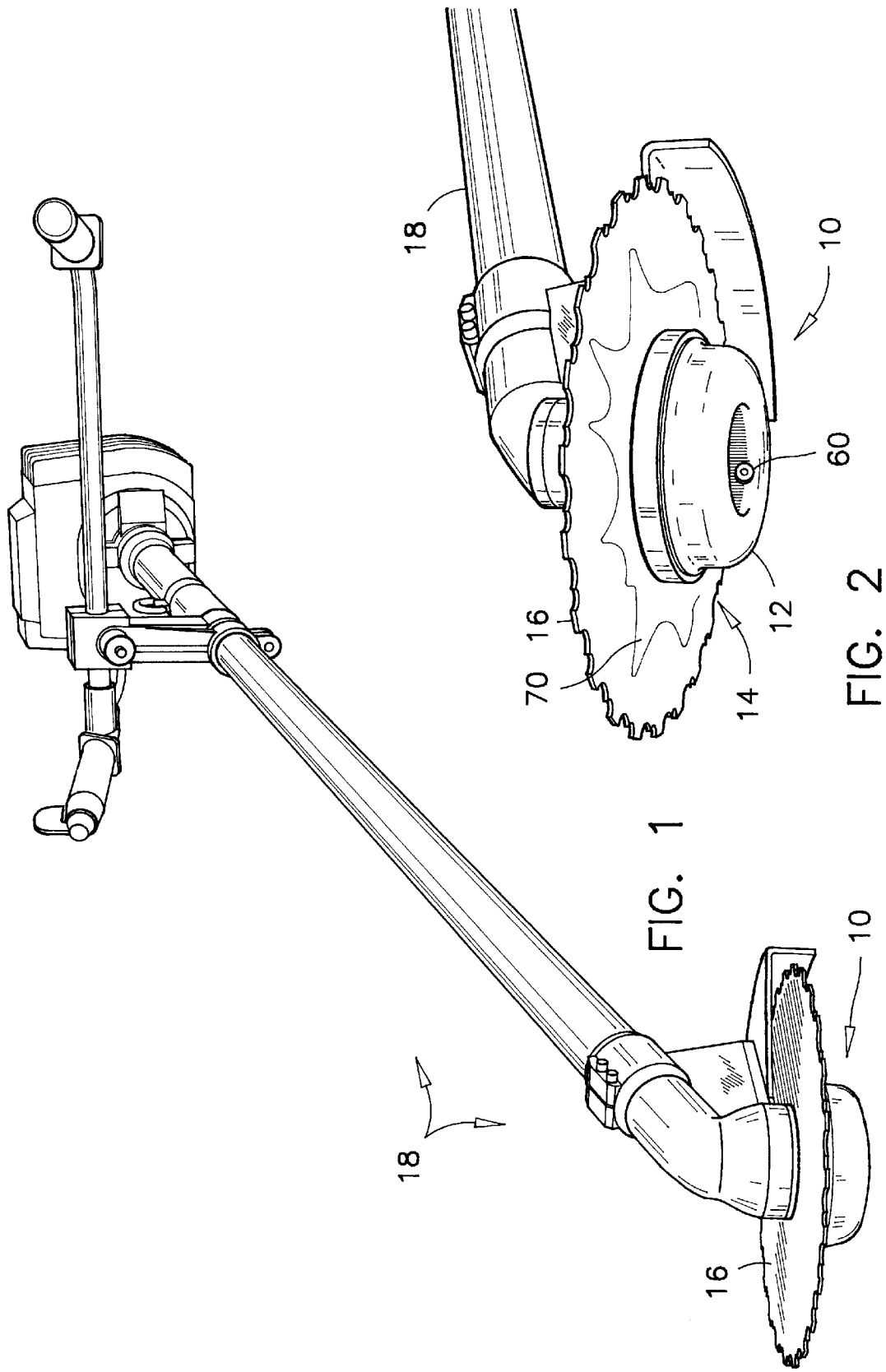

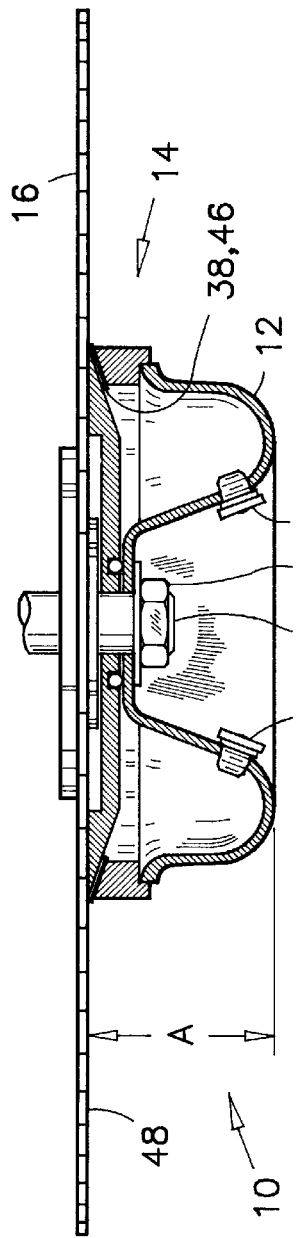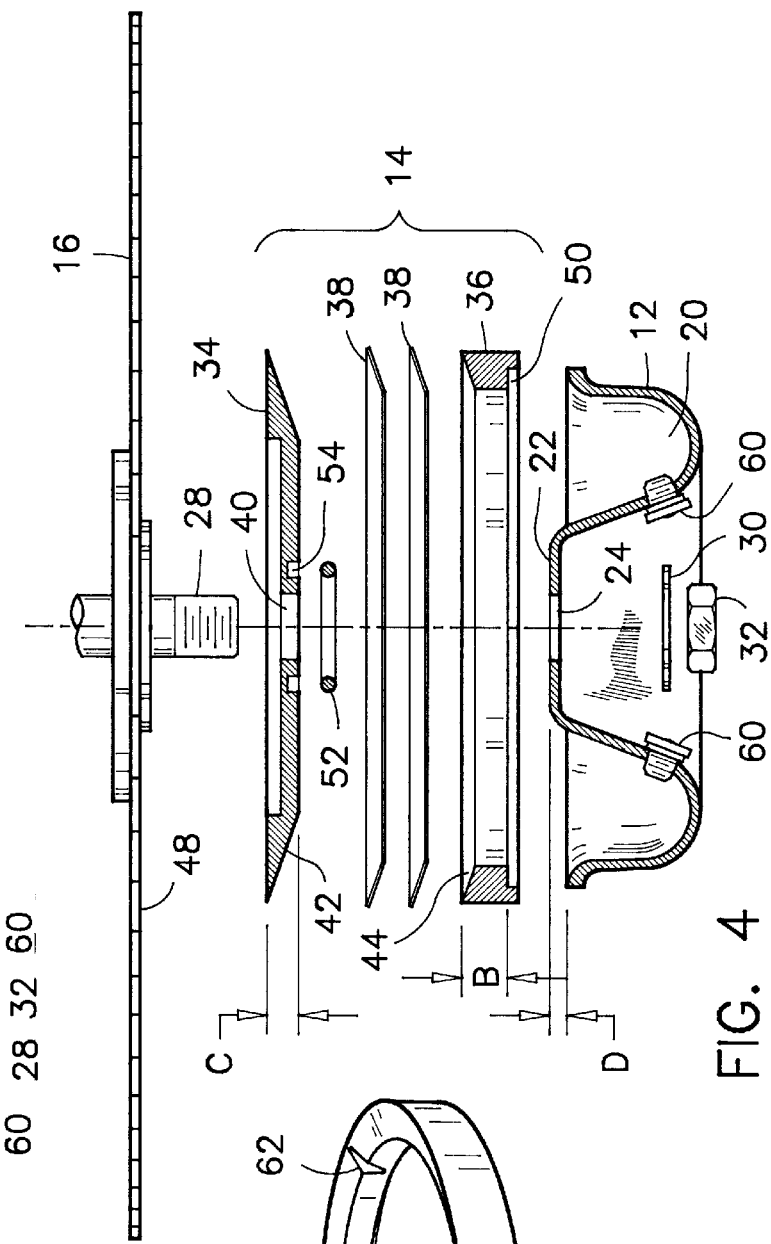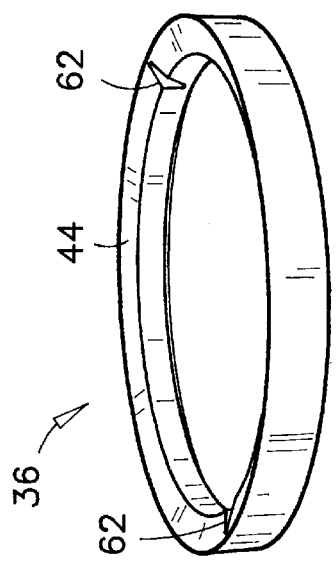
FIG. 3
FIG. 4
FIG. 5

VEGETATION CONTROL MATERIAL APPLICATOR

FIELD OF THE INVENTION

The present invention relates to a vegetation control material applicator and more particularly, the present invention relates to a vegetation control material applicator having means for dispensing a vegetation control material on the underside surface of the circular saw blade of a portable brush saw, whereby the vegetation control material is transferrable directly to the stumps of the severed plants.

BACKGROUND OF THE INVENTION

Brushwood along roads and under power lines must be periodically cut to keep these areas clear and accessible. Periodical clearing is also required to curtail forest growth along nature trails and farm lands. Similarly, a woodland management program normally includes the removing of impeding plants and the adjusting of the number of harvestable trees per acreage. These land clearing operations require substantial expenses in manpower and equipment by the owner or user of the land.

The frequency at which a clearing operation must be effected on a given land depends mostly upon the conditions of the soil and the types of plants growing in that particular area. Some tree species such as those of the birch and willow families are known to be tenacious and to sprout back very rapidly. Alder for example can have a re-growth reaching a few feet high in a single season.

In the past, a first method for reducing sprouting in a cleared area has been to spray a pesticide over the entire area. The broadcast application of the pesticide was carried out by a airplane, tractor mounted spraying equipment or by several workers each carrying a portable hand pump and a backpack reservoir.

These methods, however, are seldom used nowadays for having been objected to by Environment Regulatory Agencies and Environment Protection Agencies. Certain pesticides contain toxic elements. When the substance is sprayed widely, it can contaminate fresh water streams, wild fruits, edible plants and other food material of fish and game animals. Moreover, the workers operating the sprayers are often exposed directly to the hazardous product by wind-blown mists of pesticide from the spray nozzles.

The restrictions imposed on the broadcast applications of pesticides have promoted a need for applicators capable of delivering localized doses of vegetation control materials. Thereupon, a number of apparatus have been developed to apply a pesticide directly over the area to be treated. Amongst these apparatus, two categories are observed.

The first category of vegetation control apparatus is characterized by the application of pesticide after the brush has been cleared. A number of these herbicide applicators have a wick connected to a reservoir containing the herbicide. The wick is brought into contact with the stump of each severed tree in order to disable the root system of that plant. Typical examples of wick-type herbicide applicators are described in the following documents: U.S. Pat. No. 4,027,986 issued on Jun. 7, 1977 to Stanley R. Patrick; U.S. Pat. No. 4,553,350 issued on Nov. 19, 1985 to Hardy et al.; U.S. Pat. No. 4,357,779 issued on Nov. 9, 1982 to Mitchell E. Maddock; Canadian Patent 1,297,071 issued on Mar. 10, 1992 to Baumber et al.; and Canadian Application for Patent no. 2,183,316 having a priority date of Feb. 14, 1994 and a publication date of Aug. 17, 1995.

The use of a wick type applicator is disadvantaged by the fact that it requires a deployment of manpower over the cleared area. This inconvenience may sometimes translate into substantial expenses for a land owner or user.

The second category of vegetation control material applicators is characterized by the application of vegetation control material at the same time as the brush is being cut. For example, U.S. Pat. No. 4,372,047 issued on Feb. 8, 1983 to Toivo Marttinen, describes a manually operated pumping device mounted on a portable brush saw. The pumping unit is connected to a sapling control substance reservoir, to a spray nozzle and to a manually operated lever. The nozzle is mounted on the blade guard of the saw for spraying herbicide over the stumps distantly cut by the saw.

In another example, the U.S. Pat. No. 5,237,803 issued on Aug. 24, 1993 to Lucas Domingue, Jr. describes a centrifugal combination sprayer/cutter apparatus. The operation of this apparatus comprises the injection of a controlled quantity of pesticide into a horizontally rotating circular concave member. The centrifugal force applied by the rotating member to the pesticide causes the pesticide to splash into a shield above the rotating member and to be delivered to the weeds beneath the circular shield. A rotating blade may be affixed to the rotating member for cutting the weeds as the spray of pesticide is delivered beneath the apparatus.

In a further example, the U.S. Pat. No. 4,926,622 issued on May, 22, 1990 to Robert L. McKee, describes a combined rotary cutter and herbicide applicator. The herbicide is delivered from a reservoir through a rotary joint on the driving shaft of the rotary cutter to conduits extending lengthwise of the blades to one or more ports along the cutting part of the blades. The herbicide in thereby delivered directly to the brush being cut and to the chopped plant stems under the machine.

The herbicide used in the apparatus is preferably in the form of a gel or grease viscosity to eliminate fogging or dispersal outside the area under the brush cutter. This latter herbicide applicator is particularly advantageous for treating an area while ensuring a minimum dispersion of herbicide to surrounding uncut vegetation.

Although the efficiency of land clearing equipment have been improved greatly in recent years by the use of the above-mentioned cutter/applicator apparatus, the dispensing of vegetation control material is still approximated to an area more or less distant from the stumps of the severed plants. The efficiency of the operation is consequently at times more or less acceptable.

SUMMARY OF THE INVENTION

In the present invention, however, there is provided a portable brush saw having a vegetation control material applicator affixed to the underside surface of the saw blade thereof. The vegetation control material applicator timely dispenses vegetation control material on the underside surface of the blade, wherefrom it is readily applied to the stump of the plants being severed by the saw.

In one aspect of the vegetation control material applicator of the present invention, the applicator comprises a reservoir for containing a nominal amount of vegetation control material and a valve assembly mounted between the reservoir and the saw blade. The reservoir has an opened side which is in direct communication with the valve assembly. The valve assembly has a closable gap communicating with the reservoir and with a location near the underside surface of the saw blade. The valve assembly further has a closure means which is responsive to vibration of the saw blade, for opening or closing the closable gap when the saw blade is sawing or is running freely respectively.

During an operation of the brush saw, an impact on the saw blade caused by the saw blade entering the stem of a plant, causes the closure means to vibrate and to crack open the closable gap. Centrifugal forces acting on the vegetation control material causes a slight amount of vegetation control material to seep out through the gap. The centrifugal forces also causes the vegetation control material to spread along the underside surface of the blade to partially cover the underside surface of the blade. The vegetation control material is thus transferred to the stump of the severed tree during the cutting of the tree. The material is eventually absorbed by the bark of the tree, which trans-locates the pesticide to the root system for disabling the root system.

Advantages of the vegetation control material applicator of the present invention are numerous and include the fact that the vegetation control material is applied directly to the stump of the severed plant without producing a spray, drift or affecting the neighbouring crop trees. Selective controlling of a particular vegetation is thereby possible and effective. This localized application of the vegetation control material also ensures that sprouting is kept sparse in order to reduce the frequency of a land clearing operation.

In another aspect of the present invention, the reservoir of the vegetation control material applicator is a toroidal cup having an open top. The valve assembly has a circular shape and is mounted over the open top of the cup. The toroidal cup and the circular valve assembly are mountable on the arbour of a brush saw with the circular valve assembly being in contact with the underside surface of the saw blade. The toroidal cup and circular valve assembly each have a diameter which is substantially less than the diameter of the saw blade.

The valve assembly comprises a valve seat and a valve disc. The valve seat has a first conical surface and the valve disc has a second conical surface. The first and second conical surfaces are concentric and parallel with one-another and define the closable gap therebetween.

The valve disc is made of a material having the ability to resonate and to sustain a vibration therein. The valve seat is made of a material having vibration dampening properties. Therefore when an impulse is imparted by the saw blade to the valve assembly, a distortion of the valve disc relative to the valve seat causes the gap to expand and retract at a fast rate of speed thereby releasing a slight amount of vegetation control material on the underside surface of the blade.

The timely release of vegetation control material is closely associated with the working of the blade whereby the usage of vegetation control material is carefully restrained. The dispensing of vegetation control material is somewhat independent of the operator's experience or the obstructions of the terrain. The operation of the vegetation control material applicator of the present invention is fully automatic and the amount of vegetation control material released on a stump is proportional to the diameter of that stump.

In a further aspect of the present invention, the valve assembly has a set of spacers between the valve disc and the valve seat. The spacers are made of absorbent material and have a total thickness related to the viscosity index of the vegetation control material within the reservoir of the applicator. A proper selection of the thickness and material for the spacers is effected from tests, table or by extrapolation for efficiently metering the amount of vegetation control material seeping through the spacers and being dispensed to the saw blade during each cut.

BRIEF DESCRIPTION OF THE DRAWINGS

The preferred embodiment of the present invention will be further understood from the following description, with reference to the drawings in which:

FIG. 1 illustrates a typical brush saw having a vegetation control material applicator of the preferred embodiment mounted under the circular saw blade thereof.

FIG. 2 is a bottom and side perspective view of the circular saw blade of the typical brush saw having a vegetation control material applicator mounted thereunder.

FIG. 3 is a side view of the circular saw blade and a cross-section view of the vegetation control material applicator mounted under the blade.

FIG. 4 is an exploded cross-section view of the vegetation control material applicator of the preferred embodiment.

FIG. 5 is a top and side perspective view of the valve seat ring of the vegetation control material applicator of the preferred embodiment.

DETAILED DESCRIPTION OF THE PREFERRED EMBODIMENT

The vegetation control material applicator 10 of the preferred embodiment comprises essentially a toroidal cup 12 for holding a nominal volume of vegetation control material and a valve assembly 14 for controlling the amount of vegetation control material being dispensed by the applicator 10.

As illustrated in FIGS. 1 and 2, the applicator 10 is mounted under the saw blade 16 of a portable brush saw 18. The toroidal cup 12 extends as a bumper under the saw blade for preventing damage to the saw blade 10 when working over rocky grounds for example. For this purpose, the toroidal cup 12 is preferably made of steel, and preferably has a wall thickness of at least between about 0.060 to about 0.080 inch. The overall projection of the vegetation control material applicator 10 of the preferred embodiment beneath the saw blade, as shown by label "A" in FIG. 3, is preferably between about 1.0 inch and about 1.5 inches.

Referring now to FIGS. 3 to 5, the vegetation control material applicator 10 is illustrated therein in greater details. The toroidal cup 12 is preferably sized for containing a volume of vegetation control material in fluid form of approximately 3.38 fluid ounces (100 cubic centimetres). This volume has been found sufficient for operating the brush saw during a period equivalent to the engine's consumption of about two tanks of gasoline wherein one tank of gasoline normally provides 50 minutes of operational time.

The toroidal cup 12 comprises a circular receptacle 20 having a flat circular plate member 22 covering a central area above and circled by the receptacle 20. The circular plate 22 has a first hole 24 therein for mating on the arbour 28 of the saw blade. The dimension of the first hole 24 is a locational clearance fit over the arbour 28 such that the cup 12 is readily centered and balanced on the saw arbour 28. The toroidal cup 12 is retained to the saw arbour 28 by means of a washer 30 and a nut 32 threaded on the arbour 28.

A valve assembly 14 is mounted between the toroidal cup 12 and the saw blade 16. The valve assembly 14 comprises a valve disc 34, a valve seat ring 36 and a set of spacers 38 mounted between the valve disc 34 and the valve seat ring 36. The valve disc 34 has a second hole 40 therein along its axis. The second hole 40 is also sized to retain the disc 34 in a balanced manner on the saw arbour 28.

The valve disc 34 has a first conical surface 42 tapering outwardly toward the circumference of the saw blade 16.

The valve seat ring 36 has a second conical surface 44 tapering outwardly toward the circumference of the saw blade 16. Both the first and second conical surfaces 42, 44 define a circumferential gap 46 communicating with the cavity inside the toroidal cup 12 and a region around the valve assembly 14 being at close proximity from the underside surface 48 of the saw blade 16. The gap 46 is preferably obstructed by the set of spacers 38 for restricting the flow of vegetation control material therethrough.

The valve seat ring 36 has on a lower surface thereof a shoulder 50 which is sized to snugly fit over the circumference of the toroidal cup 12. The valve seat ring 36 is preferably mounted and sealed on the circumference of the toroidal cup 12 by means of a sealing adhesive substance. Such material is well known generally in the field of metal working for locking nuts and bolts for example.

The vegetation control material is prevented from escaping the toroid cup 12 through the first hole 24 and through the second hole 40 by means of an O-ring 52 mounted between the circular plate member 22 and the valve disc 34. The valve disc 34 preferably has a circular groove 54 therein for receiving and properly positioning the O-ring 52 around the arbour 28. It will be appreciated that O-ring 52 may be replaced by other gasket means according to the preference of a manufacturer.

The toroidal cup 12 is fillable with vegetation control material through a pair of fittings 60 having each a spring actuated plunger (not shown) through a central axis thereof as is customary with lubrication fittings. The fittings 60 are positioned inside the central opening of the toroidal cup 12 near the bottom region of the cup 12.

The toroidal cup 12 is fillable with vegetation control material when the brush saw is inverted with the underside surface of the saw blade 16 facing upwardly. The filling of the toroidal cup 12 is preferably effected with a syringe-type device (not shown) or with an all-purpose pump oiler (not shown).

A pair of fittings 60 are provided and are spaced apart 180 degrees. One fitting is used for filling the toroidal cup 12 and the other is used for venting air from the cup 12 during the filling process. A slender rigid tool or branch is normally inserted into the second fitting to allow air to escape from within the cup 12 while the vegetation control material is pumped inside the cup 12.

Another structural detail of the vegetation control material dispenser of the preferred embodiment is a number of grooves 62 in the second conical surface 44 of the valve seat ring 36. The grooves 62 extend radially relative the valve seat ring 36, and do not extend the full width of the conical surface 44. The grooves 62 extend from the inside diameter of the valve seat ring 36 and stop short of the outer circumference of the conical surface 44. The purpose of the grooves 62 is to initiate the seepage of vegetation control material through the set of spacers 38.

It is also recommended to pre-wet the spacers 38 with water or fluid herbicide before installing these spacers for a first time. This method reduces the time required for the vegetation control material to initially seep through the spacers 38.

The valve disc 34 is preferably made with bronze or brass. These materials are known in the art of making bells, cymbals and other musical instruments. These material are known for their ability to resonate and to sustain a vibration therein. The valve seat ring 36 is preferably made of aluminum. This material is considerably less sensible to shocks than bronze or brass and any vibration therein is quickly dampened.

In operation, the first saw teeth entering a stem being cut are subject to an impact force which is normally tangential or perpendicular to the saw blade. The impact is mainly due to the torque generated by the cutting action of the teeth or by the movement of the saw blade relative to the stem. This impulse is transmitted throughout the saw blade and causes the blade to imperceptibly flex and fluctuate side to side.

The vibration of the saw blade is transmitted to the valve disc 34. Although the duration of the impulse and the waving of the saw blade 16 may be limited to a fraction of a second, the valve disc 34 is made of a bronze or brass and is capable of responding to the impulse by setting a resonance within itself and sustaining that resonance for a longer period. The valve seat ring 36 being made of aluminium is more stable than the bronze or brass disc 34. Therefore the vibration of the valve disc 34 and the relative displacement of the valve disc 34 and the valve seat ring 36 causes minute openings in the gap 46 allowing the vegetation control material to seep through the spacers 38 and onto the underside surface 48 of the saw blade.

The thickness of the spacer material 38 is selected according to the viscosity of the vegetation control material used. Several tests were effected with herbicides sold under the trade name of Killex™ manufactured by Green Cross Products from Dorval, Quebec, Canada, and Vision™ manufactured by Monsanto Chemical Co from St-Louis, Mo., U.S.A. When concentrated Killex™ or Vision™ at 75% concentration in water solution is used, the preferred set of spacers 38 comprises double layers of paperboard having each a thickness of between 0.010 inch and 0.015 inch and a layer of felt having a thickness of between about 0.015 inch and about 0.030 inch. When the Vision™ herbicide is not diluted for example, the preferred spacer set 38 comprises a single layer of paperboard having a thickness of between 0.010 inch and 0.015 inch and double layers of felt having a thickness of between 0.015 and 0.030 inch.

The preferred basic clearance of gap 46 when the applicator of the preferred embodiment is assembled without spacers 38 is between 0.005 and 0.020 inch. This basic clearance has been found to be appropriate for accommodating a range of spacer materials and thicknesses as those specified above. The basic clearance of gap 46 is obtained by varying the dimensions "B", "C" and "D" as illustrated in FIG. 4.

The thickness "B" of the valve seat ring 36 may be varied to increase or to decrease the clearance of gap 46 to accommodate other spacers than those recommended herein. However, it will be appreciated that the clearance of the gap 46 is depending upon thickness "B" of the valve ring 36, the thickness "C" of the valve disk 34, the projection "D" of the circular plate 22 above the rim of the toroidal cup 12, and the compressibility of the O-ring 52. Therefore all these dimensions and factors should be taken into account when varying the clearance of gap 46.

An alternative method to the changing of dimensions "C" and "D" when changing the thickness "B" of the valve seat ring 36 is to install or remove spacer-disks (not shown) between the circular plate 22 and the O-ring 52. This alternative method is also preferred for varying the nominal volume of the applicator 10 of the preferred embodiment with kits each containing a valve seat ring 36 having a calibrated thickness and a matching set of spacer disks (not shown) for example.

With reference to the thickness of spacers 38 and the clearance of gap 46 as suggested herein, it has been found that when the brush saw is running in the non-cutting mode at speed of about 7000 rpm for extended periods of time with the applicator of the preferred embodiment mounted thereon, the herbicide does not come out through the spacers 38. This is particularly important for preventing any spray or spill of vegetation control material on the soil or on the boots of the worker handling the brush saw.

When the saw blade goes through the stem of a plant, however, a slight vibration is set in the saw blade 16 and a resonance is imparted to the valve disc 34. A slight amount of vegetation control material is allowed to seep under the action of the centrifugal forces through the spacers 38 and to spread over the underside surface 48 of the saw blade 16. The vegetation control material is thereby transferred to the exposed surface of the stump.

The amount of vegetation control material seeping out of the valve assembly 14 of the applicator of the preferred embodiment is relatively small. The amount of vegetation control material flowing out of the valve assembly is so thin that it tends to thicken up before reaching the teeth of the blade. In operation, only the odd rays of vegetation control material extend near the perimeter of the saw blade. The area of the blade normally covered by the vegetation control material seeping out of the valve assembly 14 is represented by the outline 70 in FIG. 2.

An advantage of the above feature is that when the tip of the blade is accidentally brought in contact with the bark of a crop tree for example, a slight gash in the bark of the tree is insufficient to harm the tree. The vegetation control material is applied to a stump, only when the stump is in direct contact with the underside surface of the saw blade 16.

The amount of vegetation control material which is required when treating a land with a brush saw having a vegetation control material applicator of the preferred embodiment is reduced significantly as compared to the uses of other apparatus. For example it is known that the requirement of herbicide for a broadcast application by airplane is approximately between 0.85 and 2.14 U.S. gallons per acre (8–20 litres per hectare). The requirement of herbicide in an application using portable reservoirs and spraying pumps is approximately between 0.85 and 1.28 US. gallons per acre (8–12 litres per hectare).

Comparatively, an application of the same herbicide using a brush saw having the applicator of the preferred embodiment uses between 7 and 10 fluid ounces per acre (0.5 to 0.72 litres per hectare). Furthermore the sprouting in several test plots was recorded as being as low as 5% of all the cleared trees.

Although the operation suggested herein is one where the vegetation control material is applied to the stumps of a severed trees, the efficiency mentioned above is nevertheless maintainable when few green branches are inadvertently left below the cut on the cleared trees.

While the above description provides a full and complete disclosure of the preferred embodiment of this invention, various modifications, alternate constructions and equivalents may be employed without departing from the true spirit and scope of the invention. Such changes might involve alternate components, structural arrangements, construction features or the like. Therefore, the above description and the illustrations should not be construed as limiting the scope of the invention which is defined by the appended claims.

I claim:

1. A combination of a brush saw having a circular saw blade and a vegetation control material applicator mounted under said saw blade, said vegetation control material applicator comprising:

a circular receptacle mounted on an arbour of said saw blade near an underside surface of said saw blade, said circular receptacle having a volume for containing an amount of vegetation control material in fluid form;

a circular valve assembly affixed to said circular receptacle between said circular receptacle and said circular saw blade, said circular valve assembly being mounted against said underside surface of said saw blade; said circular valve assembly and said circular receptacle each having an outside diameter being smaller than a diameter of said circular saw blade;

said circular valve assembly having a closable gap associated therewith, said closable gap extending outwardly from an inside surface of said circular receptacle and being contiguous with said underside surface of said circular saw blade;

said circular valve assembly also having a gap closure means associated therewith and being connected to said closable gap and to said circular saw blade for opening said closable gap when said circular blade is flexing under sawing stresses, and for closing said closable gap when said circular saw blade is rotating in an unstrained mode;

whereby said vegetation control material is dispensed by centrifugal force through said closable gap and on said underside surface of said circular saw blade only when said circular saw blade is sawing.

2. A combination of a brush saw having a circular saw blade and a vegetation control material applicator mounted under said saw blade as claimed in claim 1, wherein said circular valve assembly comprises a valve seat having a first conical surface and a valve disc having a second conical surface, said first and second conical surfaces being concentric and parallel to one another and defining said closable gap therebetween.

3. A combination of a brush saw having a circular saw blade and a vegetation control material applicator mounted under said saw blade as claimed in claim 2, wherein said valve disc is made of a first material and said valve seat is made of a second material; said first material being a resonating material and said second material being non-resonating material, whereby when said circular saw blade is sawing, a flexion of said circular saw blade associated with said sawing causes said valve disc to resonate and to deform relative to said valve seat thereby opening said closable gap.

4. A combination of a brush saw having a circular saw blade and a vegetation control material applicator mounted under said saw blade as claimed in claim 3 wherein said first material is one of bronze and brass and said second material is aluminium.

5. A combination of a brush saw having a circular saw blade and a vegetation control material applicator mounted under said saw blade as claimed in claim 3 wherein said circular valve assembly comprises absorbent spacer means between said first and second conical surfaces for restricting a flow of said vegetation control material through said closable gap.

6. A combination of a brush saw having a circular saw blade and a vegetation control material applicator mounted under said saw blade as claimed in claim 5 wherein a thickness of said absorbent spacer means is relative to a viscosity index of said vegetation control material in said receptacle.

7. A vegetation control material applicator for installation under a circular saw blade of a portable brush saw, for wetting an underside surface of said circular saw blade with vegetation control material, said vegetation control material applicator comprising:

a circular receptacle having a volume for containing an amount of vegetation control material in fluid form, and attachment means for affixing said circular receptacle to said underside surface of said circular saw blade;

a circular valve assembly attachable to said circular receptacle between said circular receptacle and said circular saw blade when said circular receptacle is affixed to said underside surface of said circular saw blade, said circular valve assembly and said circular receptacle each having an outside diameter being smaller than a diameter of said circular saw blade;

said circular valve assembly having a closable opening associated therewith, said closable opening having a generally radial orientation relative to said circular receptacle;

said closable opening having a first segment and a second segment, said first segment being contiguous with an inside region of said circular receptacle and said second segment being contiguous with said underside surface of said circular saw blade when said circular valve assembly is mounted against said underside surface of said circular saw blade;

said second segment being resiliently deformable relative to said first segment for resiliently opening and closing said closable opening, said second segment being jointly associable with said circular saw blade for causing a flexion thereof, thereby opening said closable opening, when said circular saw blade is flexing under sawing stresses, and for causing a straightening thereof, thereby closing said closable opening, when said circular saw blade is rotating in an unstrained mode;

whereby said vegetation control material is dispensable under the influence of centrifugal force through said closable opening and on said underside surface of said circular saw blade only when said circular saw blade is sawing.

8. A vegetation control material applicator as claimed in claim 7 wherein said first segment is valve seat having a first conical surface and said second segment is a valve disc having a second conical surface, said first and second conical surfaces being concentric and parallel to one another and defining said closable opening therebetween.

9. A vegetation control material applicator as claimed in claim 8 wherein said circular valve assembly comprises absorbent spacer means between said first and second conical surfaces for restricting a flow of said vegetation control material through said closable opening.

10. A vegetation control material applicator as claimed in claim 9 wherein a thickness of said absorbent spacer means is relative to a viscosity index of said vegetation control material in said receptacle.

11. A vegetation control material applicator for installation under a circular saw blade of a portable brush saw, for wetting an underside surface of said circular saw blade with vegetation control material, said vegetation control material applicator comprising:

a circular receptacle having a volume for containing an amount of vegetation control material in fluid form and attachment means for affixing said circular receptacle to said underside surface of said circular saw blade;

a circular valve assembly attachable to said circular receptacle between said circular receptacle and said circular saw blade when said circular receptacle is affixed to said underside surface of said circular saw blade, said circular valve assembly and said circular receptacle each having an outside diameter being smaller than a diameter of said circular saw blade;

said circular valve assembly having a valve seat having a first conical surface and a valve disc having a second conical surface, said first and second conical surfaces being concentric and parallel to one another and defining a gap therebetween, said gap extending outwardly from an inside surface of said circular receptacle and being contiguous with said underside surface of said circular saw blade when said circular valve assembly is mounted against said underside surface of said circular saw blade;

said circular valve assembly also comprising absorbent spacer means between said first and second conical surfaces for restricting a flow of said vegetation control material through said gap;

whereby when said circular saw blade is rotating said vegetation control material is restrictively forced by centrifugal force through said absorbent spacer means and on the underside surface of said circular saw blade.

12. A vegetation control material applicator as claimed in claim 11 wherein said valve disc is made of a first material and said valve seat is made of a second material; said first material being a resonating material and said second material being non-resonating material, whereby when said circular valve assembly is mounted against said circular saw blade and said circular saw blade is sawing, a flexion of said circular saw blade associated with said sawing causes said valve disc to resonate and to deform relative to said valve seat thereby opening said gap.

13. A vegetation control material applicator as claimed in claim 12 wherein said first material is one of bronze and brass and said second material is aluminium.

14. A vegetation control material applicator as claimed in claim 11 wherein said volume is between about 3 and about 4 fluid ounces.

15. A vegetation control material applicator as claimed in claim 11 wherein said circular receptacle is a toroidal receptacle and said means for affixing said toroidal receptacle to said underside surface of said circular saw blade is a circular plate having a hole therethrough and being connected to said toroidal receptacle and enclosing a central region of said toroidal receptacle; a size of said hole being a locational clearance fit over a driving arbour of said circular saw blade whereby said circular receptacle is mountable on said arbour of said circular saw blade.

16. A vegetation control material applicator as claimed in claim 15 wherein said toroidal receptacle is made of steel sheet having a thickness of between about 0.060 and 0.080 inch and has a projection underneath said saw blade of between about 1.0 and 1.5 inches when said circular receptacle is affixed to said circular saw blade.

17. A vegetation control material applicator as claimed in claim 15 wherein said toroidal receptacle has an openable port means inside a central region thereof for filling said receptacle with vegetation control material.

18. A vegetation control material applicator as claimed in claim 17 wherein said port means is a pair of fittings spaced apart 180 degree in said central region relative to said toroidal receptacle.

19. A vegetation control material applicator as claimed in claim 11 wherein a thickness of said absorbent spacer means is relative to a viscosity index of said vegetation control material in said receptacle.

20. A vegetation control material applicator as claimed in claim 11 wherein said first conical surface has at least one groove extending radially thereon for promoting a seepage of said vegetation control material through said absorbent spacer means.

* * * * *